C. E. LUCKE.
CALORIMETER.
APPLICATION FILED JUNE 27, 1906. RENEWED APR. 19, 1913.
1,136,884.
Patented Apr. 20, 1915.
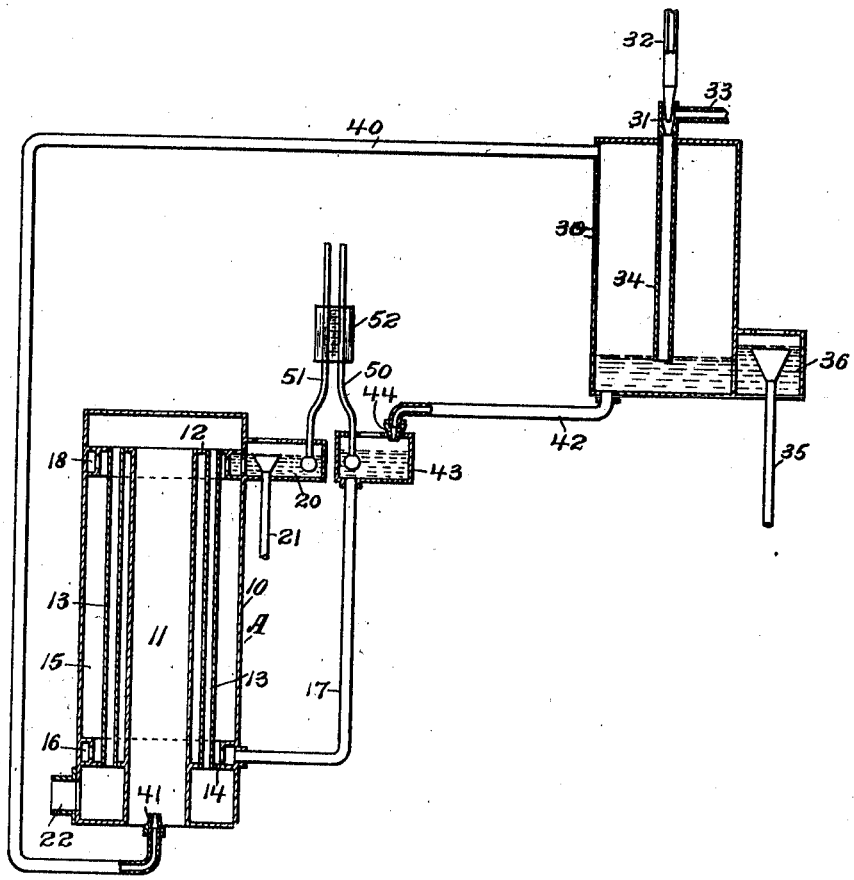

UNITED STATES PATENT OFFICE.

CHARLES E. LUCKE, OF NEW YORK, N. Y.

CALORIMETER.

1,136,884.   Specification of Letters Patent.   Patented Apr. 20, 1915.

Application filed June 27, 1906, Serial No. 323,575. Renewed April 19, 1913. Serial No. 762,386.

*To all whom it may concern:*

Be it known that I, CHARLES E. LUCKE, a citizen of the United States, residing at New York city, county of New York, and State of New York, have invented certain new and useful Improvements in Calorimeters, fully described and represented in the following specification and the accompanying drawings, forming a part of the same.

This invention relates to apparatus for measuring the heating power or value of combustibles, and especially of combustible gases, and the object of the invention is to provide a practical apparatus whereby continuous readings in terms of heat units may be obtained and all necessity of calculation avoided, the apparatus being comparatively inexpensive and of simple construction, and sufficiently accurate in results for all practical purposes.

The apparatus is intended especially for determining the heating value of gases, and certain features of the invention relate solely to the measuring of the heating value of gases.

Certain broad features of the invention, however, may be applied in the determination of the heating value of other combustibles.

The heating value of gas and other combustibles is usually measured by their capacity to effect a certain rise in temperature of a given amount of water, the British thermal unit (B. T. U.) being the amount of heat necessary to raise one pound of water from 50° to 51° F., and the heating value of a gas is usually expressed by the number of heat units in one cubic foot thereof.

In determining the heating power of combustibles, it has heretofore been the practice to measure the rise in temperature of a given weight of water by the heat evolved from the combustion of a given quantity of the combustible (a given volume in the case of gas), and in the Junkers calorimeter, an apparatus much used at the present time for measuring the heating value of gases, the heat evolved by the continuous combustion of the gas being tested is transmitted to water continuously flowing through the apparatus and the heating value of the gas per cubic foot is obtained by measuring the weight of water flowing from the apparatus in a given time, the volume of gas consumed within the same time and the temperature of the water before it enters the heating chamber and its temperature on leaving the heating chamber, and then multiplying such weight of liquid by the difference in temperature between the in-flowing and out-flowing water and dividing the product by the volume of gas consumed. Thus in determining the heating value of the gas in terms of British thermal units per cubic feet of gas (Q), W being the weight of water heated in a given time, G the volume of gas consumed in the same time, and $T_1$ the temperature of the inlet water and $T_2$ the temperature of the outlet water, then $$Q = \frac{W \times (T_1 - T_2)}{G}$$

or $$\frac{W}{G}(T_1 - T_2).$$

From this it appears that the calorific power of the gas per cubic foot is the product of the water temperature rise by the ratio of the weight of water to cubic feet of gas. In accordance with the present invention, it is proposed to fix this ratio and measure the calorific value of the gas, as in terms of B. T. U., by the temperature rise, preferably by means of a sliding scale reading in terms of degrees of temperature or heat units, or by other automatic or hand adjustable reading or indicating devices, or by a suitable recording device. In determining the calorific power of the gas in this manner it is not necessary to measure the quantity of water used or the quantity of gas consumed, it being only required to establish and maintain a certain known fixed relation between the quantity of water used and the quantity of gas consumed in a unit of time, and it is not even necessary that the rate of flow of water and gas be constant, but only that the ratio of the quantity of water and quantity of gas be maintained constant. In order to maintain such constant ratio between the quantity of water and volume of gas, there is preferably provided means for supplying the water and gas under equal pressure, and measuring nozzles, one through which the gas will flow and the other through which the water will flow. The relative amounts of water and gas passing through the nozzles will thus be determined by the size of the nozzle openings and the nozzles may be readily calibrated to provide for the exact relative flow of water and gas desired. For supplying the water and gas under equal pressure there is preferably provided a small reservoir to which the water and gas are supplied by an injector, the water in passing through the injector acting to carry the gas in with it, the gas then rising to the top of the reservoir and the water falling to the bottom, and excess water and gas being allowed to escape through a suitable overflow device. Water and gas may then be drawn from the reservoir under equal pressure and discharged through measuring nozzles to the heating device. For determining the temperature rise of the water, two thermometers are arranged, one in the path of the water passing to the heating chamber, and the other in the path of the water passing from the heating chamber with their stems close together, and a sliding scale is placed adjacent to the thermometer stems and arranged to be moved so that the zero mark thereof may be made to coincide with the top of the column of mercury in the supply water thermometer. The sliding scale may be marked to read in heat units per cubic feet of gas, or may be marked merely to show the temperature rise from which the heat units per cubic feet of gas may be readily determined according to the known ratio between the amount of water heated and gas consumed.

A full understanding of the invention can best be given by a detailed description of a construction embodying the features of the invention in a preferred form, and such a description will now be given in connection with the accompanying drawing showing diagrammatically a simple form of apparatus.

In said drawing A represents the heater which comprises a shell or casing 10 within which is arranged a vertical cylindrical open ended flue or combustion chamber 11 extending from the bottom of the casing 10 to a horizontal partition or flue plate 12 near the top of the casing. From the plate 12 a series of pipes 13 extend downward about the central flue 11 to a second partition or flue plate 14 located near the bottom of the casing, such pipes forming draft flues connecting the space within the casing above the flue plate 12 with the space below the flue plate 14. The space between the walls of the casing 10 and the combustion chamber 11 and through which the flue pipes 13 extend, forms the water heating chamber or passage 15 into which water enters from an annular supply channel 16 located at the bottom of the water chamber and to which the water is supplied by a supply pipe 17. From the water chamber 15 the water passes into an annular outlet channel 18 located at the top of the water chamber, which outlet channel 18 communicates with a small open chamber 20 from which the water escapes through a discharge pipe 21.

The gas which is to be tested for calorific value is supplied to and burned within the combustion chamber 11 into which air is also allowed to enter through the open bottom thereof, the products of combustion passing upward through the combustion chamber and thence downward through the pipes 13 to the space below the flue plate 14 from which space they escape through an outlet 22. The water flowing through the chamber 15 will thus be heated by contact with the central combustion chamber and the pipes 13, and the parts will be so proportioned according to the supply of gas and water that all the heat generated by the combustion of gas will be absorbed by the water in the chamber 15. This part of the apparatus may be of any known or suitable construction and will be suitably protected against radiation of heat as will be understood.

The water and gas are supplied to the heater from an equal pressure chamber 30 into which the water and gas pass together from an injector 31, designed to supply an excess of both water and gas above the quantity which can flow from the chamber through the measuring nozzles as hereinafter described, the water being supplied to the injector under some suitable pressure through a water supply pipe 32 and serving to draw in with it as it passes through the injector gas from the gas supply pipe 33, the water and gas then passing together downward through an inlet pipe 34 which opens into the lower portion of the chamber 30 below the water level therein. The gas will then rise into the upper portion of the chamber and the water will collect in the lower portion, excess water escaping through a discharge pipe 35 from an open chamber 36 in communication with the chamber 30 below the water level, and excess gas also escaping through the water seal to the open chamber 36 from which it may escape or be conducted as desired, the water seal being equivalent to a loaded check or relief valve. By this means, though the quantity of water and gas entering the chamber 30 may vary according to the pressure of the water in the supply pipe 32, yet the gas pressure and the water level within the chamber will always be constant and the water will be under the pressure of the gas in the chamber. From the top of the chamber 30 a gas pipe 40 leads to a burner opening located near the bottom of the combustion chamber of the heater, the flow of gas to the combustion chamber being controlled and measured by means of a measuring nozzle 41, the orifice of which, as shown, forms the burner opening. A water pipe 42 leads from the lower portion of the chamber 30 and delivers into a small open reservoir 43, the flow of the water from the pipe 42 being controlled and measured by a measuring nozzle 44 which stands at or slightly below the water level in the chamber 30 to give a water supply to the water nozzle 44 at a pressure equal to that at which the gas is supplied to the nozzle 41. From the reservoir 43 the water passes to the chamber 15 of the heater through the supply pipe 17.

The pressure of the gas in the chamber 30, which is also the pressure on the water in the chamber, is determined by the head of water in the open discharge chamber 36 above the opening between the chamber 36 and the chamber 30. So long as water and gas are entering the chamber 30 in excess of the amount required to maintain the water level in the chamber and the gas pressure in the chamber, the water level must stand with but very slight variation at the level of the top of the opening between the chambers 30 and 36, excess water escaping through the chamber 36 and discharge pipe 35, and excess gas escaping also through the water seal formed by the water standing at a higher level in the chamber 36. This equal pressure device, as above described, will thus also act as a constant pressure device supplying the water and gas to the measuring nozzles under a predetermined constant pressure.

A thermometer 50 is arranged with its bulb in the reservoir 43, and a second thermometer 51 is arranged with its bulb in the chamber 20, and their stems are brought close together and the thermometers are set at the same height so that the difference in the height of the column of mercury in the stems of the two thermometers will vary according to the difference in the temperature between the water flowing to and the water flowing from the heater. A sliding scale 52 is arranged in connection with the thermometer stems so that it may be moved to bring its zero mark to position to coincide with the top of the column of mercury in the supply water thermometer. The scale in the supply water thermometer. The scale if marked to read in degrees of temperature will thus, when properly adjusted to the top of the column of mercury in the supply water thermometer, show by reading to the top of the column of mercury in the discharge water thermometer the difference in temperature between the supply water and the discharge water. As, however, the heating value of the gas is, as above stated, the product of the water temperature rise and the ratio of the quantity of water used and quantity of gas consumed, and as this ratio is fixed by having the water and gas supplied under constant and equal pressures to the measuring nozzles 44 and 41, therefore, the heating value of the gas will vary with the water temperature rise and the scale may be marked to read in heat units (as B. T. U.) per cubic feet of gas. By properly adjusting the sliding scale, therefore, and reading to the top of the column of mercury in the discharge water thermometer the number of B. T. U.'s or other heat units per unit quantity of gas may be read off at once and all necessity of calculation avoided. The reading will thus be continuous and correct so long as the measuring nozzles are kept free and clean and the scale set to the supply water temperature. The nozzles are preferably made removable as shown, so as to be readily taken off and cleaned or replaced by others.

The operation of the apparatus will be understood from the foregoing description and need not be further set out. It will be understood also that the invention is not to be limited to the exact arrangement of parts as shown, but that changes and modifications thereof within the claims may be made.

What is claimed is:—

1. A calorimeter for measuring the heating value of gases comprising a heater for water or other liquid having a water chamber or passage and a combustion chamber or passage, means for causing a continuous flow of water through the water chamber or passage and a continuous flow of gas to the combustion chamber and for maintaining a continuously constant predetermined ratio between the quantity of water flowing through the water chamber or passage and the quantity of gas flowing to the combustion chamber or passage, said means comprising means providing a measuring orifice for the water and a measuring orifice for the gas and means for maintaining a continuously constant predetermined ratio between the pressures at which the water and gas are supplied to their respective measuring orifices; and means for measuring the rise in temperature of the water in passing through the water chamber or passage, substantially as described.

2. A calorimeter for measuring the heating value of gases, comprising a heater for water or other liquid having a water chamber or passage and a combustion chamber or passage; means for causing a continuous flow of water through the water chamber or passage and a continuous flow of gas to the combustion chamber or passage and for maintaining a continuously constant predetermined ratio between the quantity of water flowing through the water chamber or passage and a quantity of gas flowing to the combustion chamber or passage, said means comprising means providing a measuring orifice for the water and a measuring orifice for the gas and means for supplying the water and gas to their respective measuring orifices under equal pressures; and means for measuring the rise in temperature of the water in passing through the water chamber or passage, substantially as described.

3. A calorimeter for measuring the heating value of gases comprising a heater for water or other liquid having a water chamber or passage and a combustion chamber or passage; means for causing a continuous flow of water through the water chamber or passage and a continuous flow of gas to the combustion chamber and for maintaining a continuously constant predetermined ratio between the quantity of water flowing through the water chamber or passage and the quantity of gas flowing to the combustion chamber or passage, said means comprising means providing a measuring orifice for the water and a measuring orifice for the gas and means for maintaining a continuously constant predetermined ratio between the pressures at which the water and gas are supplied to their respective measuring orifices; and indicating means controlled by the rise in temperature of the water in passing through the water chamber or passage and having a scale reading to heat units, substantially as described.

4. A calorimeter for measuring the heating value of gases, comprising a heater for water or other liquid having a water chamber or passage and a combustion chamber or passage; means for causing a continuous flow of water through the water chamber or passage and a continuous flow of gas to the combustion chamber or passage and for maintaining a continuously constant predetermined ratio between the quantity of water flowing through the water chamber or passage and the quantity of gas flowing to the combustion chamber or passage, said means comprising means providing a measuring orifice for the water and a measuring orifice for the gas and means for supplying the water and gas to their respective measuring orifices under equal pressures; and indicating means controlled by the rise in temperature of the water in passing through the water chamber or passage and having a scale reading to heat units.

5. A calorimeter for measuring the heating value of gases comprising a heater for water or other liquid having a water chamber or passage and a combustion chamber or passage; means for causing a continuous flow of water through the water chamber or passage and a continuous flow of gas to the combustion chamber and for maintaining a continuously constant predetermined ratio between the quantity of water flowing through the water chamber or passage and the quantity of gas flowing to the combustion chamber or passage, said means comprising means providing a measuring orifice for the water and a measuring orifice for the gas and means for maintaining a continuously constant predetermined ratio between the pressures at which the water and gas are supplied to their respective measuring orifices; and indicating means controlled by the rise in temperature of the water in passing through the water chamber or passage, such indicating means having a sliding scale which may be adjusted according to the temperature of the water fed to the heater, substantially as described.

6. A calorimeter for measuring the heating value of gases comprising a heater for water or other liquid having a water chamber or passage and a combustion chamber or passage; means for causing a continuous flow of water through the water chamber or passage and a continuous flow of gas to the combustion chamber and for maintain a continuously constant predetermined ratio between the quantity of water flowing through the water chamber or passage and the quantity of gas flowing to the combustion chamber or passage, said means comprising means providing a measuring orifice for the water and a measuring orifice for the gas and means for maintaining a continuously constant predetermined ratio between the pressures at which the water and gas are supplied to their respective measuring orifices; a thermometer for measuring the temperature of the water flowing to the water chamber or passage, and a thermometer for measuring the temperature of the water flowing from the combustion chamber or passage, said thermometers having their stems arranged relatively to each other so that the difference in height of the liquid therein will correspond to the difference in temperature of the inflowing and outflowing water, and a sliding scale associated with the thermometer stems and reading to heat units, substantially as described.

7. A calorimeter for measuring the heating value of gases, comprising a heater for water or other liquid having a water chamber or passage and a combustion chamber or passage; means for causing a continuous flow of water through the water chamber or passage and a continuous flow of gas to the combustion chamber or passage and for maintaining a continuously constant predetermined ratio between the quantity of water flowing through the water chamber or passage and the quantity of gas flowing to the combustion chamber or passage, said means comprising means providing a measuring orifice for the water and a measuring orifice for the gas and means for supplying the water and gas to their respective measuring orifices under constant and equal pressures; and means for measuring the rise in temperature of the water in passing through the water chamber or passage, substantially as described.

8. A calorimeter for measuring the heating value of gases, comprising a heater for water or other liquid having a water chamber or passage and a combustion chamber or passage; means for causing a continuous flow of water through the water chamber or passage and a continuous flow of gas to the combustion chamber or passage and for maintaining a continuously constant predetermined ratio between the quantity of water flowing through the water chamber or passage and the quantity of gas flowing to the combustion chamber or passage, said means comprising means providing a measuring orifice for the water and a measuring orifice for the gas and means for supplying the water and gas to their respective measuring orifices under predetermined constant pressures; and means for measuring the rise in temperature of the water in passing through the water chamber or passage, substantially as described.

In testimony whereof, I have hereunto set my hand, in the presence of two subscribing witnesses.

CHARLES E. LUCKE.

Witnesses:
J. A. GRAVES,
A. L. KENT.